(12) United States Patent
Ollila et al.

(10) Patent No.: US 7,480,451 B2
(45) Date of Patent: Jan. 20, 2009

(54) COMBINED ACTUATOR FOR CAMERA SHUTTER AND FOCUS FUNCTIONS

(75) Inventors: Mikko A. Ollila, Tampere (FI); Olli-Pekka Haila, Piikkiö (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/477,881

(22) Filed: Jun. 29, 2006

(65) Prior Publication Data
US 2007/0081805 A1 Apr. 12, 2007

(51) Int. Cl.
*G03B 17/00* (2006.01)
*H04N 7/00* (2006.01)
*H04M 1/00* (2006.01)

(52) U.S. Cl. .............................. 396/79; 396/80; 396/85; 348/552; 348/E9.01; 455/556.1

(58) Field of Classification Search .................. 396/76, 396/77, 79–83, 85–87; 398/79; 235/375; 348/222, 233, 211, 222.1, 211.99, 552, E5.042, 348/E5.044, E9.01, 223
See application file for complete search history.

(56) References Cited

U.S. PATENT DOCUMENTS

| 3,631,777 | A | * | 1/1972 | Mita .......................... 396/255 |
| 5,189,458 | A | * | 2/1993 | Miyamoto et al. ............ 396/76 |
| 6,046,769 | A | * | 4/2000 | Ikeda et al. ............... 348/222.1 |
| 2004/0208571 | A1 | * | 10/2004 | Shahar et al. ................. 398/79 |
| 2005/0001024 | A1 | * | 1/2005 | Kusaka et al. ............... 235/375 |

\* cited by examiner

*Primary Examiner*—Melissa Jan Koval
(74) *Attorney, Agent, or Firm*—Foley & Lardner, LLP

(57) ABSTRACT

The combined actuator described can be incorporated into a miniaturized camera product. In the camera product, the shutter driver uses the focus or zoom actuator's power amplifiers to control the current flow in shutter actuators. As such, the space needed for the camera's electronics is smaller and it is less expensive to manufacture the camera product.

22 Claims, 11 Drawing Sheets

COMBINED ACTUATOR FOR CAMERA SHUTTER AND FOCUS FUNCTIONS

CROSS REFERENCE TO RELATED APPLICATIONS

The present application is related to U.S. patent application Ser. No. 11/205,558, filed Aug. 17, 2005 and incorporated herein by reference in its entirety.

BACKGROUND OF THE INVENTION

1. Field of the Invention

The present invention relates generally to miniaturized camera products. More specifically, the present invention relates to a combined actuator that drives both shutter and focus functions in miniaturized camera products.

2. Description of the Related Art

This section is intended to provide a background or context. The description herein may include concepts that could be pursued, but are not necessarily ones that have been previously conceived or pursued. Therefore, unless otherwise indicated herein, what is described in this section is not prior art to the claims in this application and is not admitted to be prior art by inclusion in this section.

The traditional shutter driver for a camera forces constant current to be drawn through a magnetic actuator. To have a predictable and stable closing time, the current needs to be an accurate DC current. The actuation principle is similar for aperture adjust and neutral density (ND) filter actuators. The magnetic actuator has equivalent resistance and inductance. Generally, current needed for the shutter driver is between 60 mA and 200 mA. The direction of the current determines the opening or closing of the shutter.

FIG. 1 illustrates a circuit diagram of a traditional driver for a camera shutter and iris-ND filter. To close the shutter, switch S1 is closed and S2 is open. To close the iris-ND filter, switch S5 is closed and S6 is open. In either situation (closing the shutter or closing the iris-ND filter), switch S4 is closed and S3 is open. When S4 is closed, an operational amplifier 20 forces the voltage over a resistor 22 to be equal to the reference voltage, Vref by controlling the gate voltage of G1 or G5 depending upon whether the shutter or iris is opened. The gate voltage defines the channel resistance of the MOSFET, which in turn, defines the current. The closed loop control system sets the current to the Vref/R. The resistor is often an external 1% accurate resister. A one Ohm resistor is a typically selection.

To open the shutter, switch S1 is opened and S2 is closed. To open the iris-ND filter, switch S5 is opened and S6 is closed. In either situation (opening the shutter or opening the iris-ND filter), switch S3 is closed and S4 is open when S2 or S6 is closed (depending whether shutter or iris is operated). An operational amplifier 20 forces the voltage over a resistor 22 to be equal to the reference voltage, Vref, by controlling the gate voltage of G3. The gate voltage defines the channel resistance of the MOSFET, which in turn defines the current. The closed loop control system sets the current to the Vref/R. In this configuration, current flows in a different direction (compared to the closing situation).

Generally, the shutter actuator has a resistance of about 8-24 Ohms and requires current from about 60 mA to 200 mA. Where the resistance is 8 Ohms and the current is 200 mA, the voltage over the actuator is 1.6 V. About 0.2 V is needed over the resistor. Mobile cameras typically have a supply voltage of 2.8 V. Thus, only 1 V is left to be divide over switch S1 and S4. It follows that the resistance of S1 and S4 should be 2.5 Ohms, which is a large area low Ron MOSFET. Currently, the trend in mobile devices is to reduce the supply voltage, which would require even larger MOSFETS.

Class D amplifiers are typically used to drive zoom and autofocus actuators. These actuators can be piezoceramic actuators. A class D amplifier is an amplifier in which the output transistors are operated as switches rather than as a current source. Because an ideal switch has either zero voltage across it or zero current through it at all times, it dissipates no power. When a particular transistor is turned off, the current through it is zero. When the transistor is turned on, the voltage across the switch is small (ideally zero). This increases the overall efficiency of the amplifier, requiring less power from the power supply and smaller heat sinks for the amplifier.

A conventional tuned class D type of amplifier is shown in FIG. 2(a). A class D amplifier includes a P-type FET (PFET), an N-type FET, (NFET) two body diodes and a tuned load. The two FET gates are driven with signals that are about identical, but that prevents a simultaneous state of the two FET gates and a large shoot through current flow from the supply to ground. Another version of class D amplifier is shown in FIG. 2(b), where a rectangular waveform is applied to a low-pass filter rather than a tuned filter. The low-pass filter allows only its slowly-varying DC or average voltage to appear on the load. In FIG. 2(b), separate $V_P$ and $V_N$ drive stages are shown. These can be used to make the drive signals for $V_P$ and $V_N$ such that a simultaneous ON state for the two semiconductor switches can be prevented. The circuit shown in FIG. 2(a) can also have such driving of the gates. Although reasonably useful, class D amplifiers suffer from significant drawbacks. The major factors limiting the performance of class D inverters are switching losses and switching noise as discussed below. The switching loses result at least partially from resistive losses in Ron of switching devices. As such, it is advantageous to have low Ron devices driving piezo actuators. Although, in contrast to class A, B, and C amplifiers, switched mode power amplifiers such as class D amplifiers have an idealized efficiency of 100%, the combination of switching and conduction losses sets an upper bound on the amplifiers' power efficiency.

U.S. patent application Ser. No. 11/205,558, filed Aug. 17, 2005 and which is assigned to the same assignee as the present application, provides for the use of class DE amplifiers in conjunction with piezoceramic elements for actuating digital camera systems such as autofocus and zoom lens systems. In class DE amplifiers, switching losses are reduced in comparison to class D amplifiers. Each switching transistor in a class DE amplifier is on for less than a half period. There are two intervals of time in a period when both of the transistors are simultaneously off. During these intervals of "under lapping," the shunt capacitances are recharged by the load current from 0 to $V_{max}$ or from $V_{max}$ to 0. As such, each transistor is turned on under its output voltage $V_{out} \approx 0$. Therefore, the switching power losses are substantially absent. In addition, electromagnetic interference is reduced because of "soft switching" during the dead time of the switches.

FIG. 3 illustrates a conventional combination of a shutter-iris driver and an autofocus/zoom actuator driver. The combination includes an iris-neutral density (ND) filter 32, a shutter 34, a piezo actuator 36, and a piezo actuator 38. The iris-ND filter 32 is coupled to MOSFETS 42, 44, 46, and 48. The shutter 34 is coupled to MOSFETS 46, 48, 50, and 52. The piezo actuator 36 is coupled to MOSFETS 54 and 56. The piezo actuator 38 is coupled to MOSFETS 58 and 60. As such, regardless of whether a class D or class DE amplifier is used, the conventional combination of a shutter iris driver and zoom/autofocus functions needs 10 MOSFETS and 5 outputs (outputs 61-65).

Thus, there is a need for a combination actuator that saves four MOSFETS and two outputs, resulting in six MOSFETS and 3 outputs. Further, there is a need for a combination actuator that results in smaller used silicon space and reduced costs to manufacture.

SUMMARY OF THE INVENTION

In general, the present invention provides a combined actuator incorporated into a miniaturized camera product. In the camera product, the shutter driver uses the focus or zoom actuator's power amplifiers to control the current flow in shutter actuators. As such, the space needed for the camera's electronics is smaller and it is less expensive to manufacture the camera product.

One exemplary embodiment relates to a driver configured to provide electric current to an autofocus/zoom driver and a light control driver. The driver includes first switches configured to couple to a first actuator, second switches configured to couple to a second actuator, and a multiplexer selecting inputs to the first and second switches. The first and second switches are coupled to the light control driver.

Another exemplary embodiment relates to a combination system that drives a camera shutter and camera filter as well as a camera autofocus and zoom control. The system includes a filter coupled to a first plurality of MOSFETs, a shutter coupled to a second plurality of MOSFETs, and actuators coupled to a third plurality of MOSFETs. The first plurality of MOSFETS includes first, second, third and fourth MOSFETs; the second plurality of MOSFETs includes first, second, fifth and sixth MOSFETs; and the third plurality of MOSFETs includes third, fourth, fifth and sixth MOSFETs.

Another exemplary embodiment relates to a method of driving a camera shutter, a camera filter, a camera zoom lens, and a camera autofocus lens. The method includes opening a camera shutter by closing a first switch, opening a second switch, opening a fifth switch, and closing a sixth switch; driving a camera zoom lens by opening the first and second switches and selectively manipulating actuators using third, fourth, fifth and sixth switches; and opening a camera filter by opening a first switch, closing a second switch, opening a third switch, and closing a fourth switch.

Other exemplary embodiments are also contemplated, as described herein and set out more precisely in the appended claims.

DETAILED DESCRIPTION OF EXEMPLARY EMBODIMENTS

Figure 1:
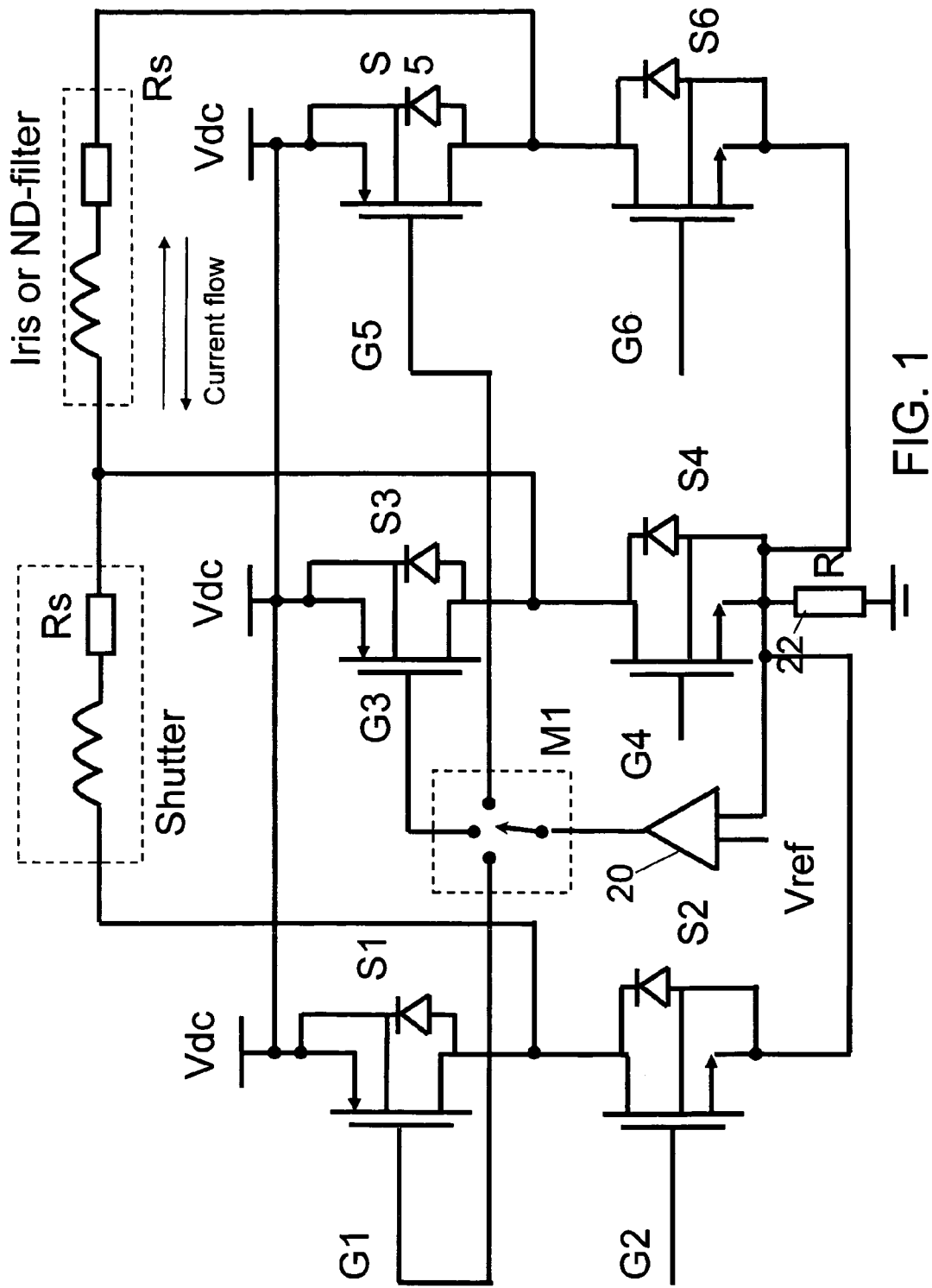
FIG. 1 is a circuit diagram of a traditional driver for a camera shutter and iris-neutral density (ND) filter.
Figure 2A:
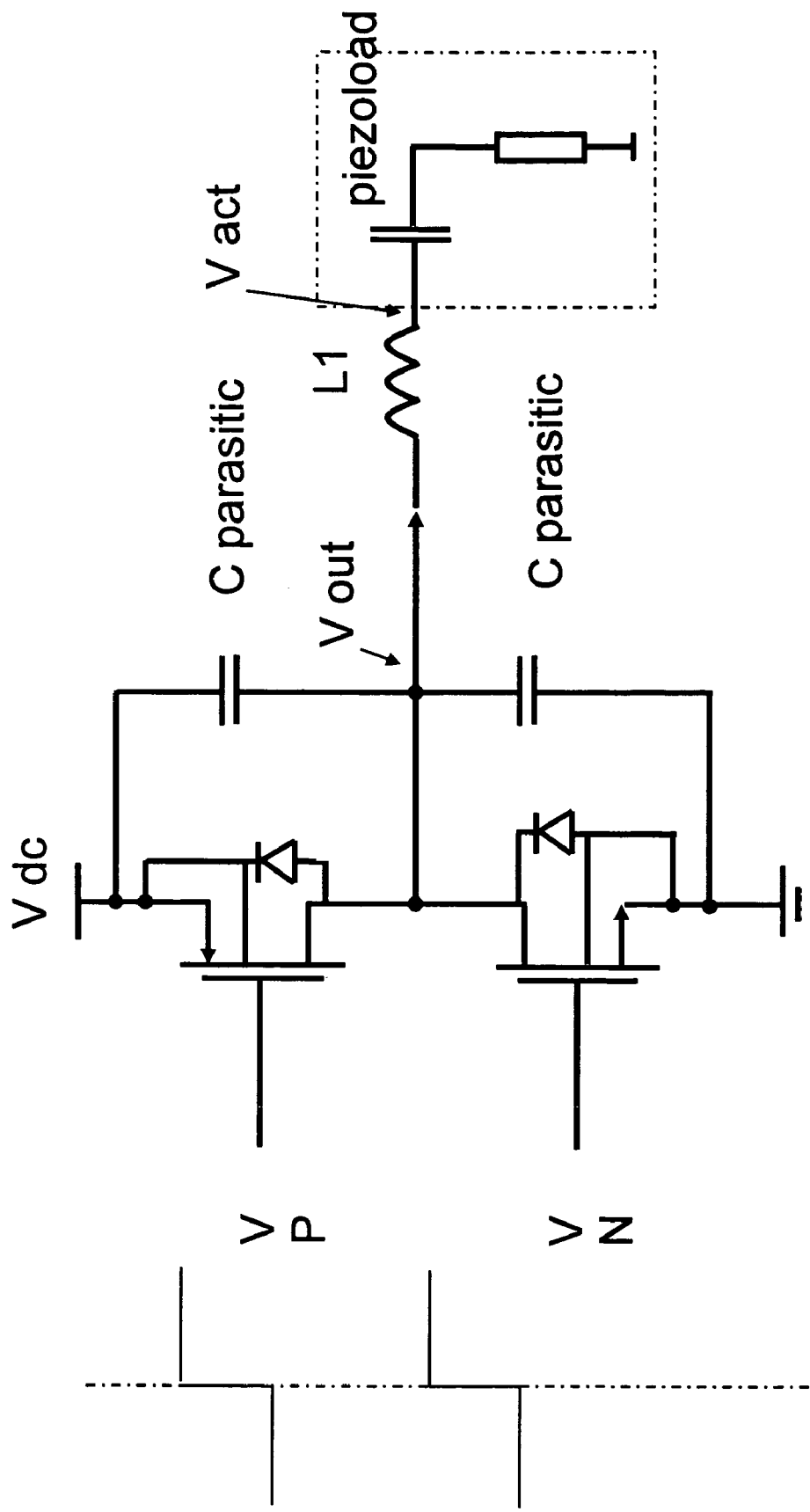
FIGS. 2(a) and 2(b) are representations of conventional class D amplifiers.
Figure 2B:
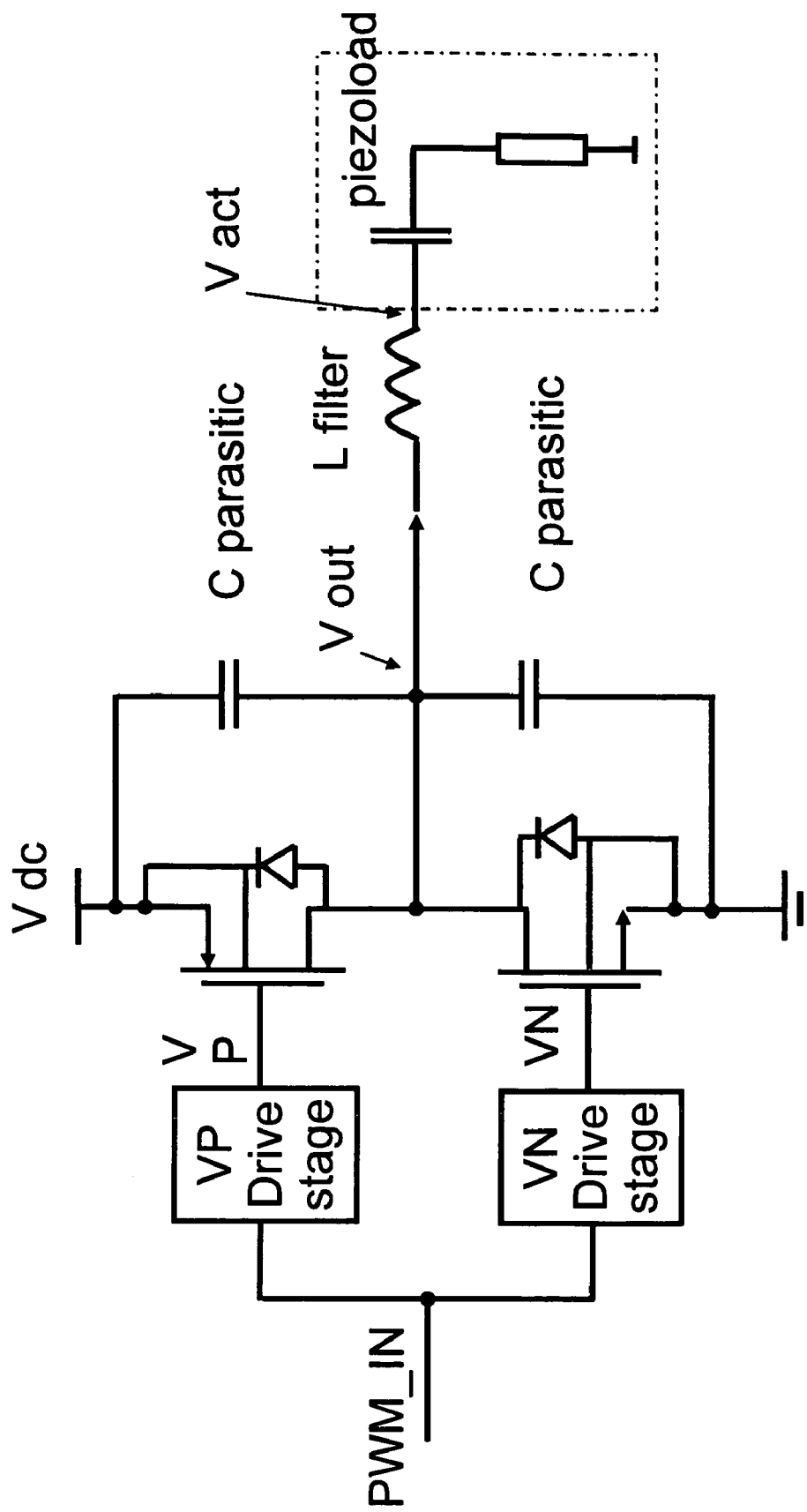
Figure 3:
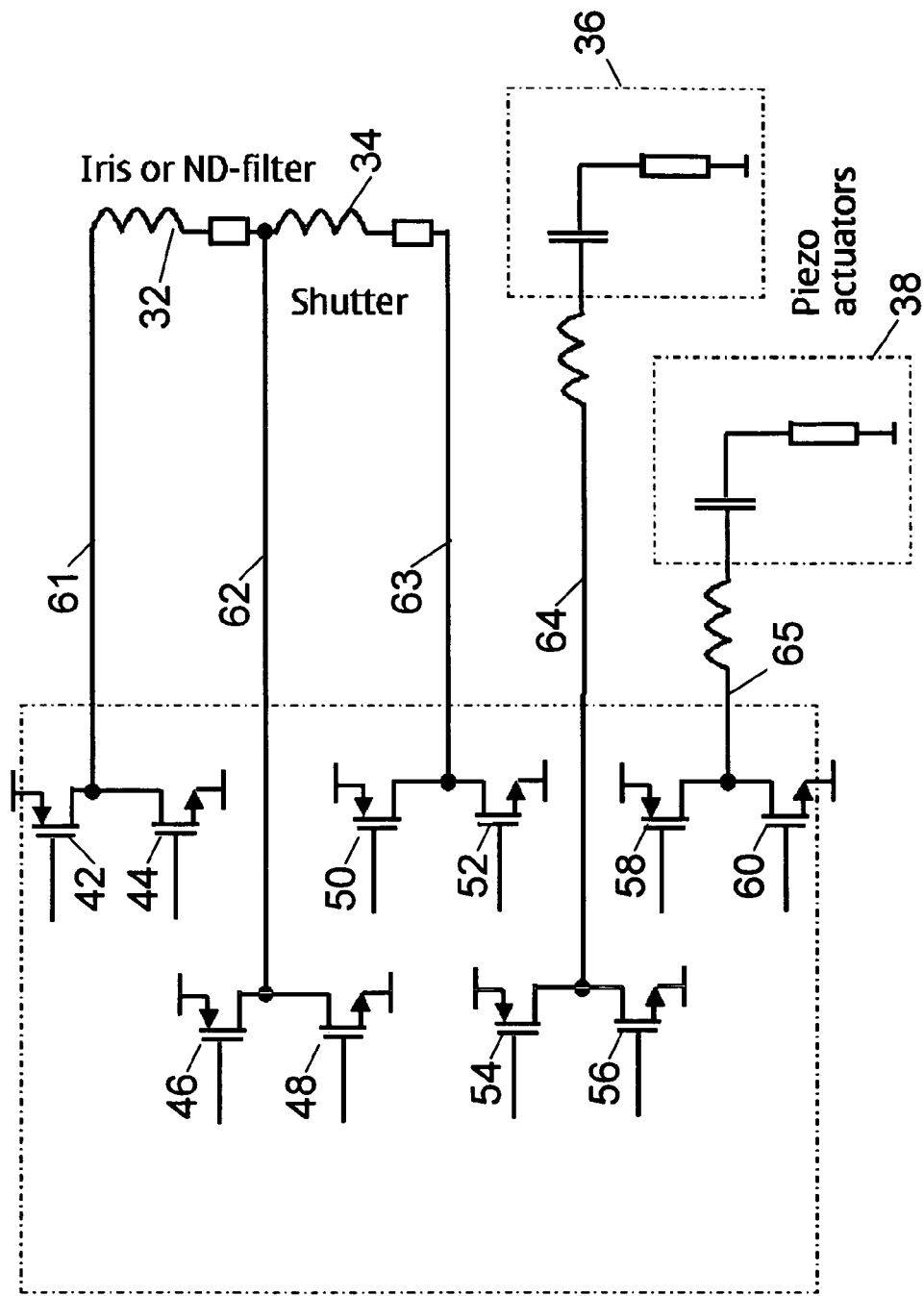
FIG. 3 is a circuit diagram of a conventional combination of a shutter-iris driver and an autofocus/zoom actuator driver.
Figure 5:
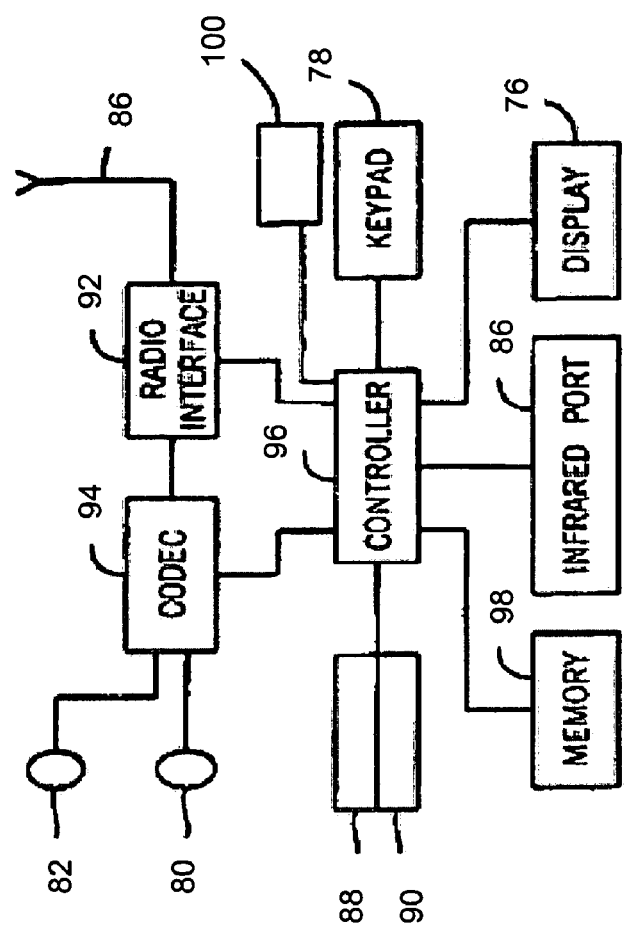
FIG. 5 is a schematic representation of circuitry of the mobile phone of FIG. 3 in accordance with an exemplary embodiment.
Figure 4:
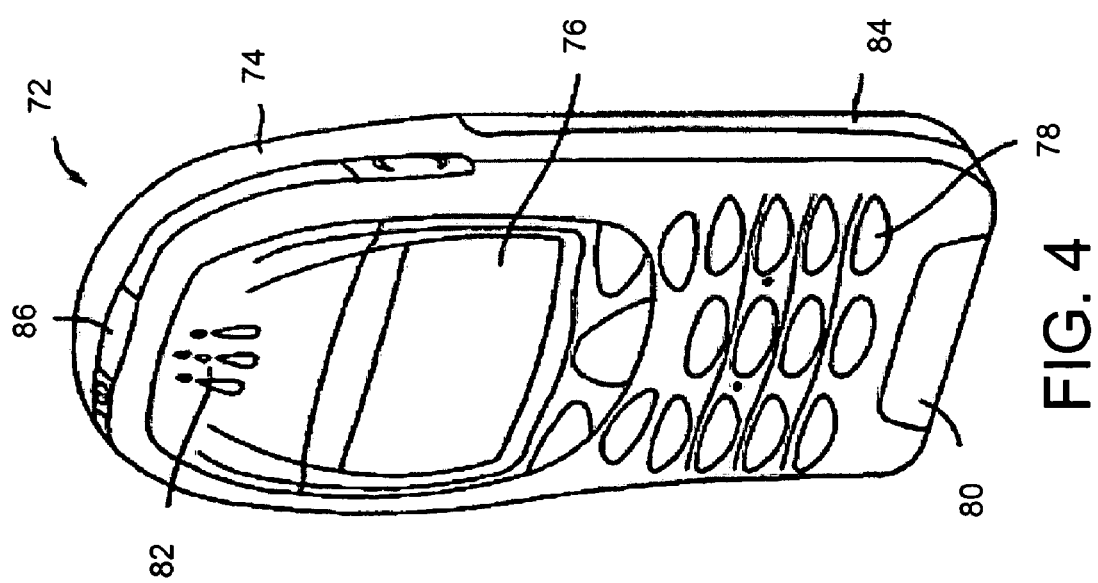
FIG. 4 is a perspective view representation of a mobile phone having a camera module constructed in accordance with an exemplary embodiment.

FIGS. 4 and 5 illustrate a representative mobile telephone 72 within which a camera module constructed according to the principles of the exemplary embodiments may be implemented. It should be understood, however, that the present invention is not intended to be limited to one particular type of mobile telephone 72 or other electronic device. The present invention can also be incorporated into a stand alone digital camera with no additional accessories.

The mobile telephone 72 of FIGS. 4 and 5 includes a housing 74, a display 76 in the form of a liquid crystal display, a keypad 78, a microphone 80, an ear-piece 82, a battery 84, an infrared port 86, an antenna 86, a smart card 88, a card reader 90, radio interface circuitry 92, codec circuitry 94, a controller or processor 96 and a memory 98. Individual circuits and elements are all of a type well known in the art, for example in the Nokia range of mobile telephones. A camera module 100 is also operatively connected to the controller or processor 96.

Figure 6:
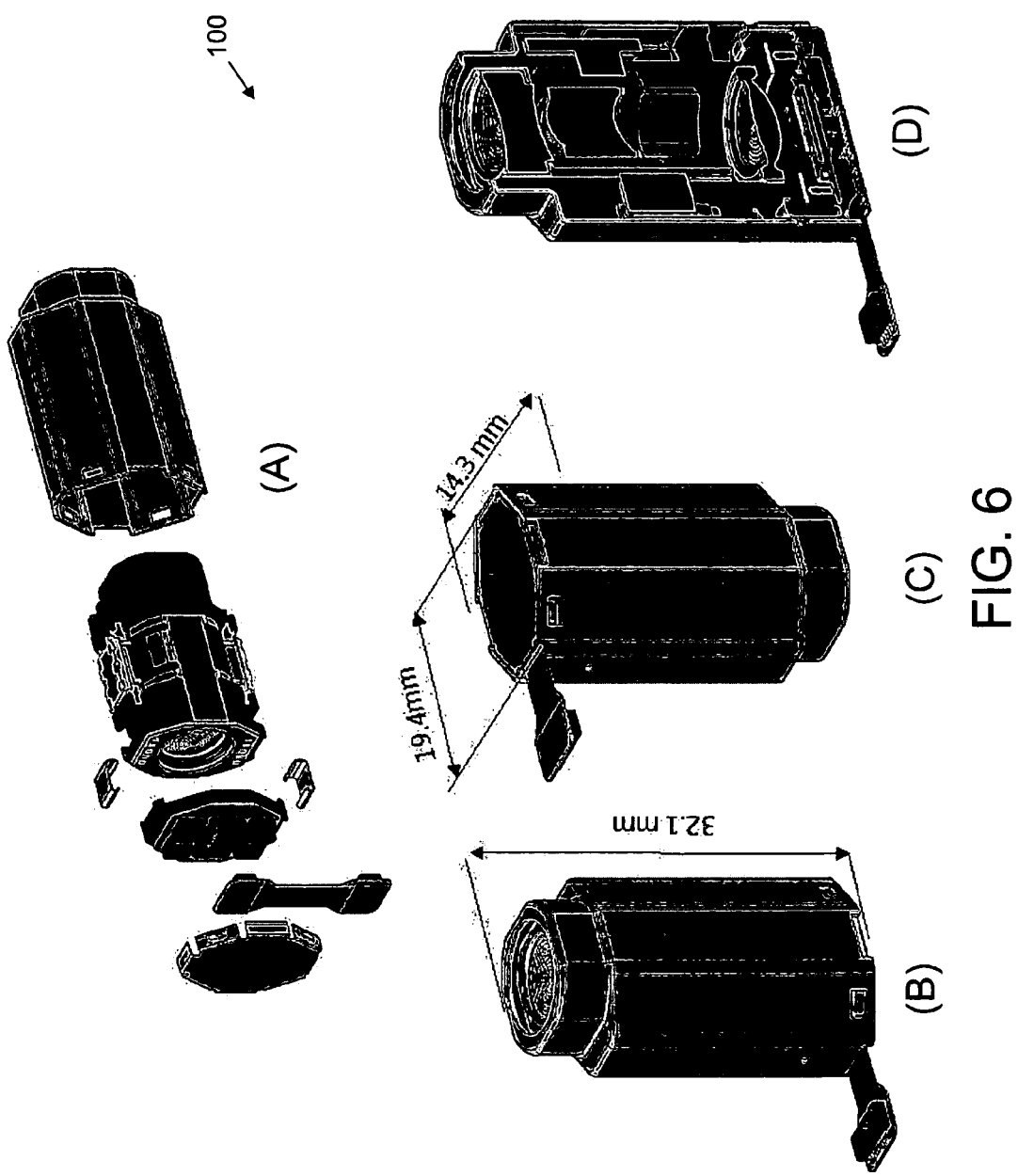
FIG. 6 is a representation of a miniaturized camera module for the mobile phone of FIG. 3 in accordance with an exemplary embodiment.

FIG. 6 illustrates the camera module 100 from an exploded view (A), a first perspective view (B), a second perspective view (C), and a cutout view (D). In an exemplary embodiment, the camera module 100 has a height of 32.1 mm and a width and thickness of 19.4 mm and 14.3 mm, respectively. As can be appreciated by a person of skill in the art, reduction of electric circuitry is helpful in the design and operation of the camera module 100.

Figure 7:
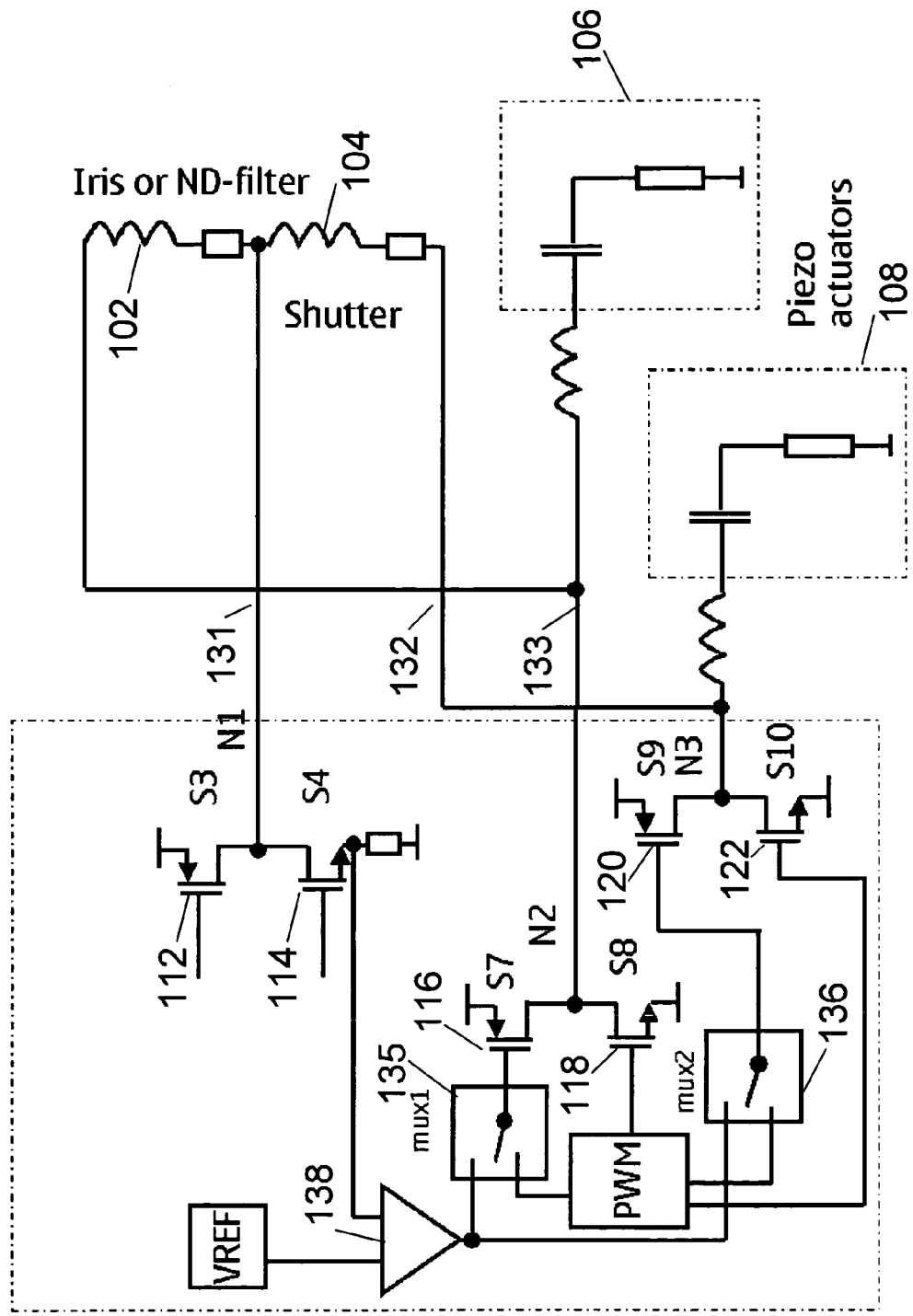
FIG. 7 is a circuit diagram of a combined shutter-iris driver and autofocus/zoom actuator driver in accordance with an exemplary embodiment.

FIG. 7 illustrates a combination of a shutter-iris driver and an autofocus/zoom actuator driver in accordance with an exemplary embodiment. The combination can be implemented in a device such as mobile telephone 72 described with reference to FIGS. 4-6. The implementation illustrated includes an iris-neutral density (ND) filter 102, a shutter 104, a piezo actuator 106, a piezo actuator 108. The iris-ND filter 102 is coupled to MOSFETS 112, 114, 116, and 118. The shutter 104 is coupled to MOSFETS 112, 114, 120, and 122. The piezo actuator 106 is coupled to MOSFETS 116 and 118. The piezo actuator 108 is coupled to MOSFETS 120 and 122. As such, the combination illustrated in FIG. 6 functions with 6 MOSFETS and 3 outputs (outputs 131-133). In alternative embodiments, the MOSFETS 112-122 are replaced by other suitable switching devices.

Output 131 is connected to iris-ND filter 102 and shutter 104. Output 132 is connected to shutter 104 and piezo actuator 108. Output 133 is connected to iris-ND filter 102 and piezo actuator 106. In such a configuration it is assumed that the camera autofocus or zoom does not work at the same time as the shutter. The situation where autofocus and zoom do not work simultaneously is typical because actuators are first driven to the correct zoom factor and focus position, and then the image is taken. The shutter closing is used to define the end of the exposure time of the image. When the camera autofocus or zoom operates, S3 and S4 (MOSFETS 112 and 114) are open and output 131 is a high impedance node (N1), which does not allow current to flow.

The camera autofocus and zoom are controlled using actuators 106 and 108. The camera autofocus and zoom normally do not operate at the same time. In some embodiments, however, separate PWM modules are used, allowing autofocus and zoom to operate independently. The actuators 106 and 108 are controlled by MOSFETS 116, 118, 120, and 122. MOSFET 116 is coupled to a multiplexer 135 and MOSFET 120 is coupled to a multiplexer 136. Either the multiplexer 136 or the multiplexer 135 selects a gate control voltage or a pulse width modulation (PWM) pattern as an input to the MOSFET 116 or 120. A multiplexer (not shown) is also used to select the gate control of MOSFETS 112 and 114 between the PWM pattern and the actuating of the iris-ND filter 102 or shutter 104. To close the shutter 104, MOSFET 120 (S9) and MOSFET 114 (S4) are closed and are controlled by a control loop. To open the shutter 104, MOSFET 112 (S3) and MOSFET 122 (S10) are both closed, MOSFET 114 (S4) and MOSFET 120 (S9) are both opened, MOSFET 116 (S7) and MOSFET 118 (S8) are both opened, and output 133 is a high impedance node.

The following table details the state of each switch depending on whether the iris/camera shutter needs to be opened or closed. When reading this table, it is noted that the Vref voltage controls the opening and closing of the camera shutter. When Vref=low, the shutter is closed while, when Vref=high, the shutter is open.

| Switch | shutter | | Iris/ND filter | |
|---|---|---|---|---|
| | Open | Close | Open | Close |
| S3 | Closed | Open | Open | Closed |
| S4 | Open | Closed | Closed | Open |
| S7 | X1 | X2 | Closed | Open |
| S8 | X2 | X2 | Open | Closed |
| S9 | Open | Closed | X2 | X1 |
| S10 | Closed | Open | X2 | X2 |

| | zoom | autofocus |
|---|---|---|
| S3 | Open | Open |
| S4 | Open | Open |
| S7 | Open | PWM |
| S8 | Open | PWM |
| S9 | PWM | Open |
| S10 | PWM | Open |

X1 - The state of the switch could be open or closed. If it is closed, there is approximately the same voltage on each terminal and, therefore, the driver does not cause motion in the element while the other element is being moved.
X2 - The state of the switch can be open but not closed. If it is closed, there is a voltage across one element while the other element is being moved, causing both elements to be moved at the same time.
PWM - PWM refers to a pulse width modulation (PWM) pattern used as an input to switches S7-S10.

Figure 8:
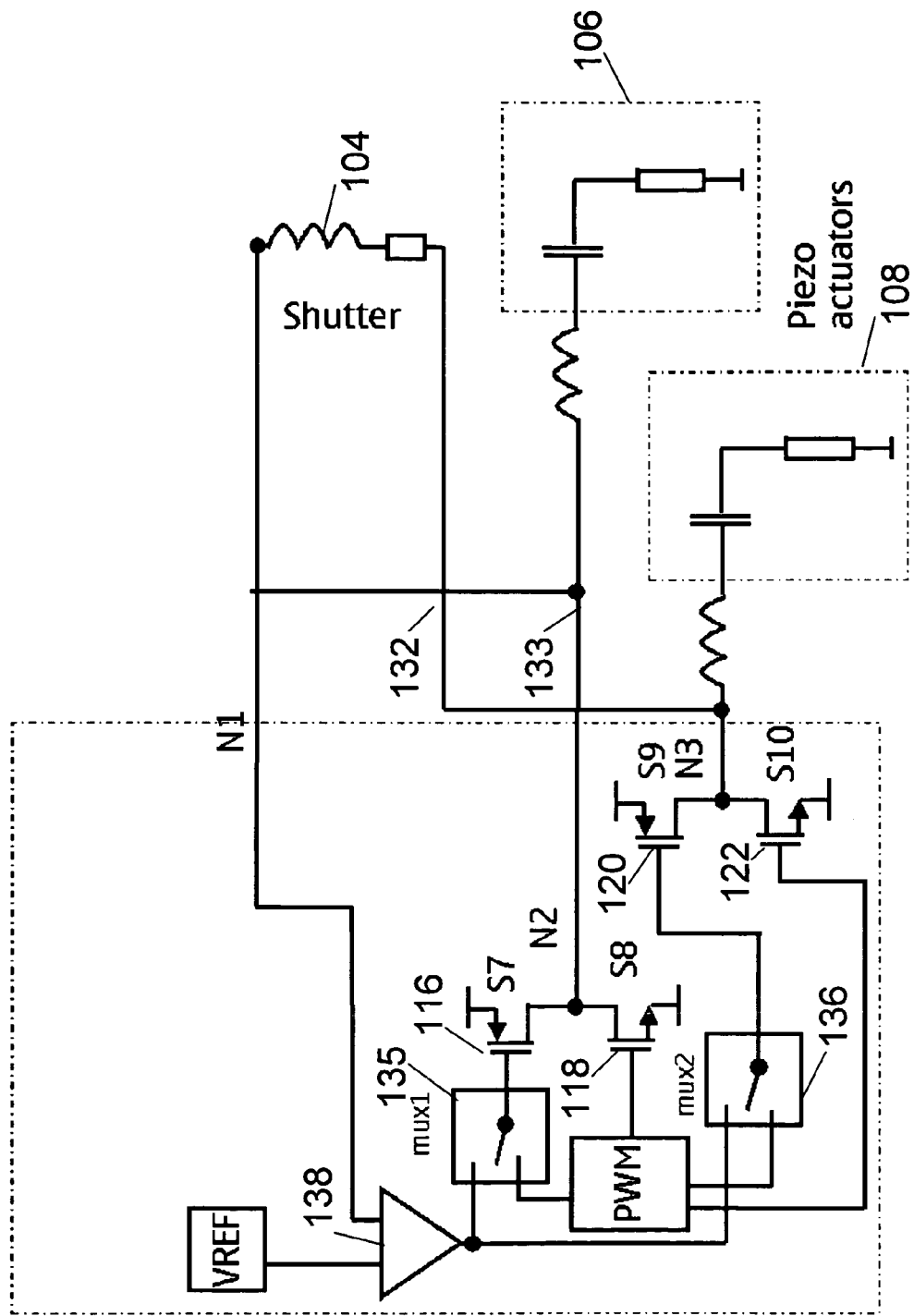
FIG. 8 is the circuit diagram of FIG. 7 with switches and iris filter removed in accordance with an alternative embodiment.

FIG. 8 illustrates the combination described with reference to FIG. 7 except MOSFETs 112 and 114 and iris-ND filter 102 have been removed. Alternatively, iris-ND filter 102 could be present and the shutter 104 is removed. Iris-ND filter 102 and shutter 104 are light control elements. A camera device may have only one of the iris-ND filter 102 and shutter 104 in mechanical form. For example, some iris arrangements could be electronic.

Figure 9:
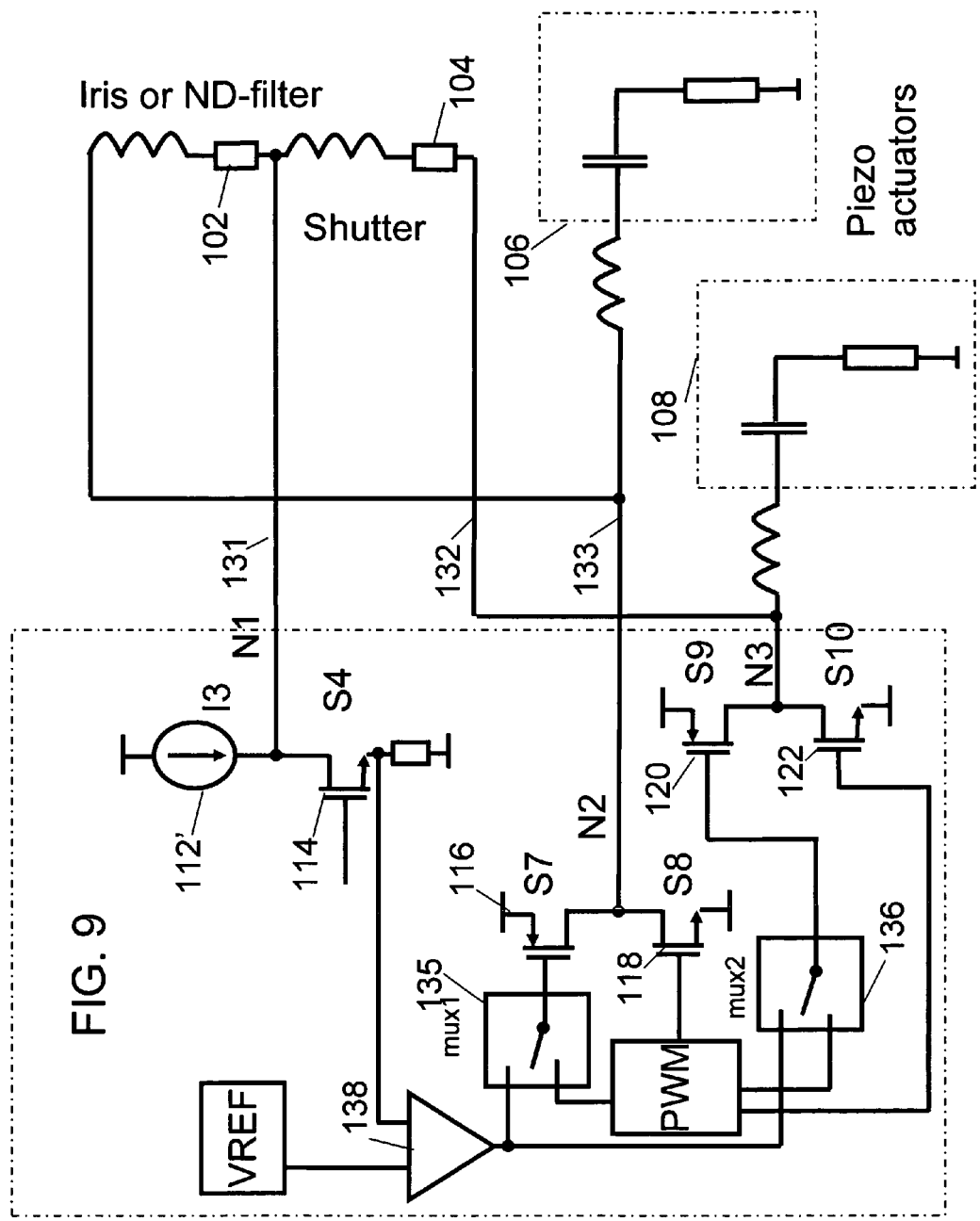
FIG. 9 is a first alternative embodiment for the circuit of FIG. 7.
Figure 10:
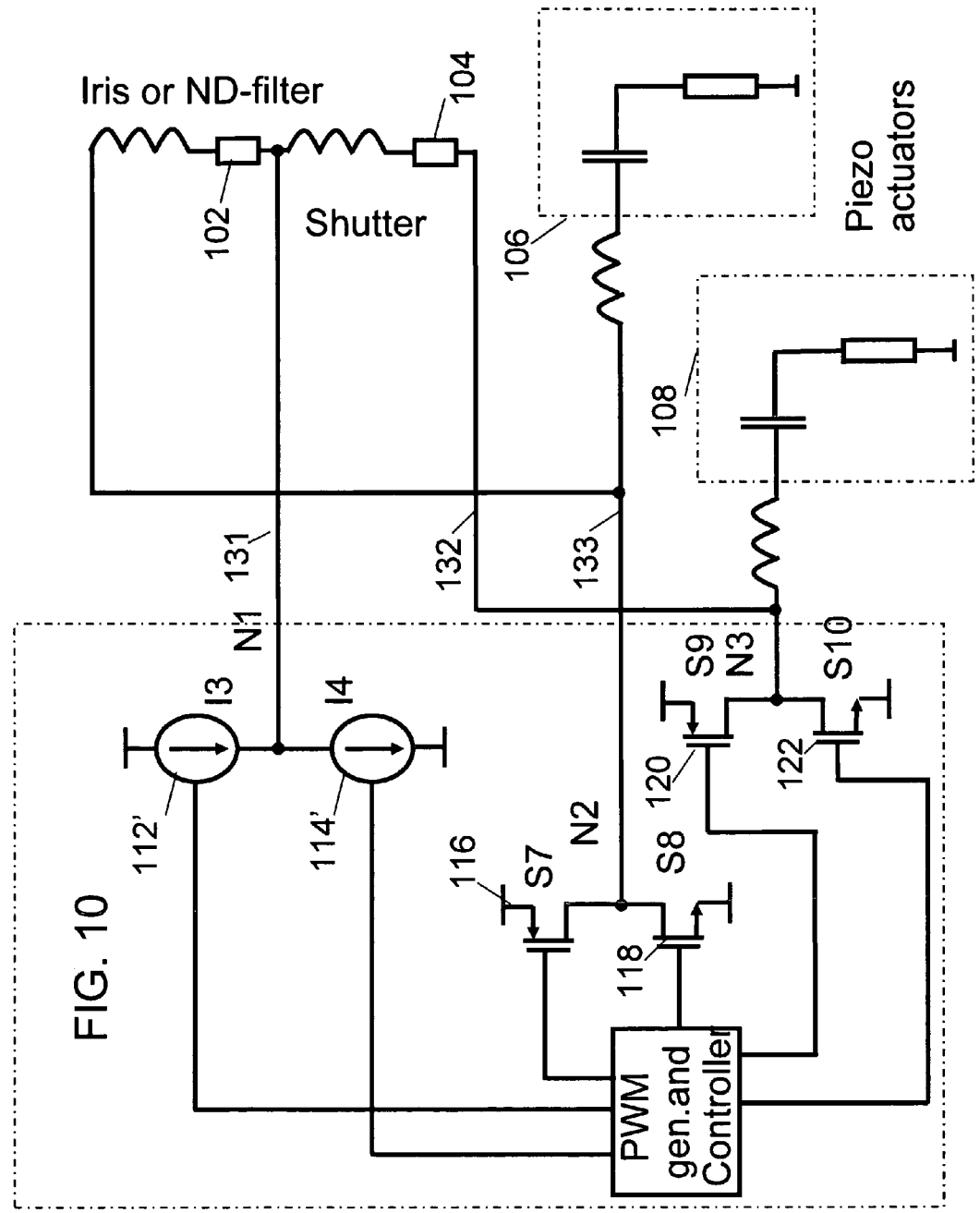
FIG. 10 is a second alternative embodiment for the circuit of FIG. 7.
Figure 11:
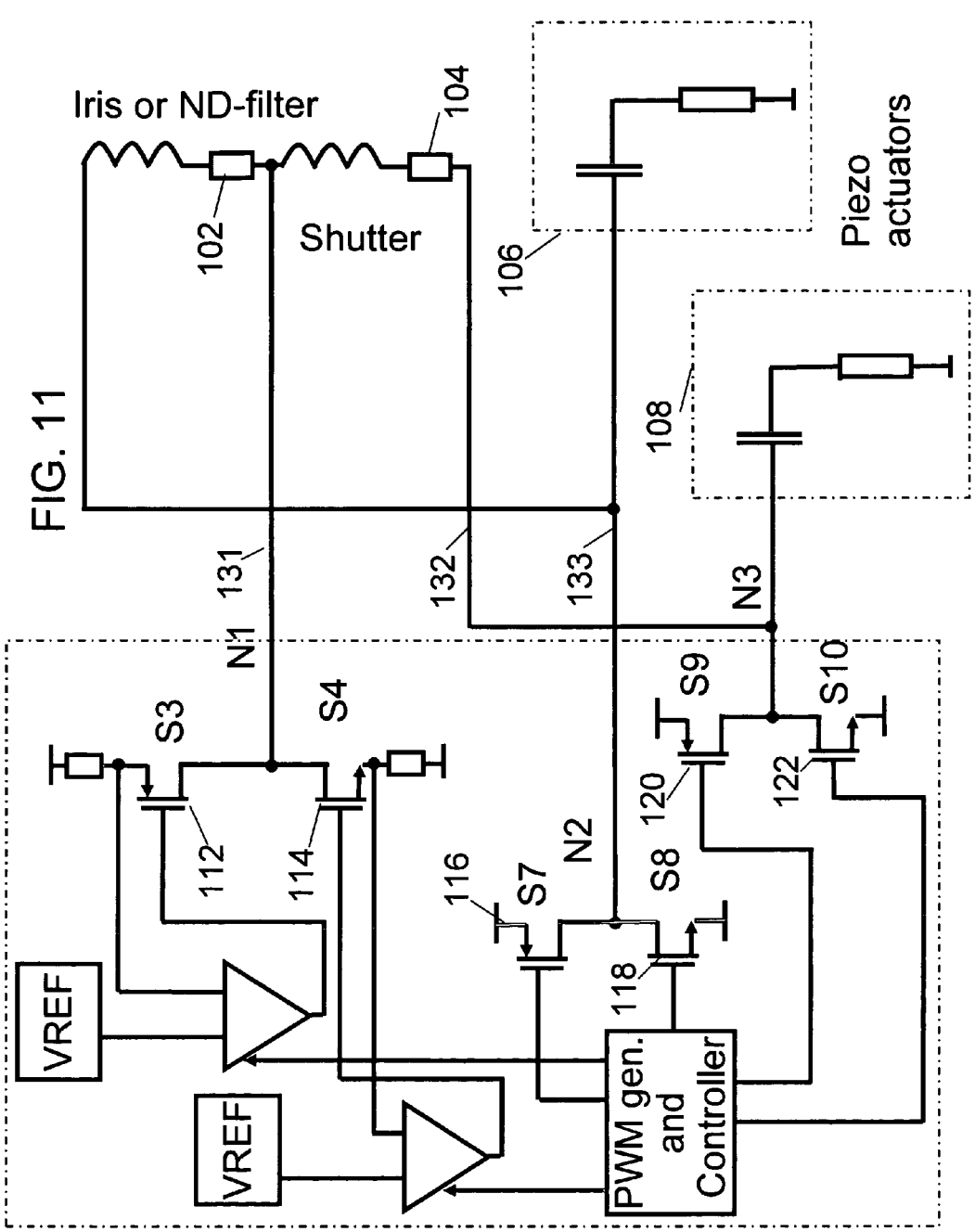
FIG. 11 is a third alternative embodiment for the circuit of FIG. 7.

FIG. 9 and FIG. 10 illustrate alternative embodiments to the embodiment described with reference to FIG. 7. FIG. 9 illustrates that MOSFET 112 (S3) has been replaced by a current source 112'. FIG. 10 illustrates that MOSFET 114 (S4) has been replaced by a current source 114'. Such an embodiment has an advantage in that it is not necessary to multiplex the analog control voltage to Class D amplifiers. Class D switches may require complex driving circuitry, and it is difficult to bring an analog control voltage to this circuitry. Current sources 112' and 114' can be made using a local feedback loop, as illustrated in FIG. 11. FIG. 11 also does not require inductors to the piexo actuators 106 and 108. Depending on the embodiment, both outputs 132 and 133 can be part of an autofocus actuator such that the actuator for the shutter can be driven by a frequency that it can be responsive to.

Advantageously, the configuration illustrated in FIGS. 4-11 provides for a camera on a mobile communicator having a combination shutter-iris driver and an autofocus/zoom actuator driver. This combination includes six MOSFETS and 3 outputs, which is a reduction in four MOSFETS and two outputs from conventional configurations. The reduced circuitry results in smaller used silicon space and reduced costs to manufacture. Further, if driving electronics are outside of the camera module, fewer pads in the camera module mechanical interface are needed. Fewer pads helps in reducing the size requirements of the camera module.

While several embodiments of the invention have been described, it is to be understood that modifications and changes will occur to those skilled in the art to which the invention pertains. Accordingly, the claims appended to this specification are intended to define the invention more precisely.

The invention claimed is:

1. A driver configured to provide electric current to a zoom/auto focus driver and a light control driver, the driver comprising:
   first switches configured to couple to a first actuator;
   second switches configured to couple to a second actuator, wherein the first and second switches are coupled to the light control driver; and multiplexer selecting inputs to the first and second switches.

2. The driver of claim 1, wherein the first switches comprise two MOSFET devices.

3. The driver of claim 1, wherein the light control element comprises a camera shutter.

4. The driver of claim 1, wherein the driver is part of a camera integrated in a mobile communication device.

5. The driver of claim 1, further comprising third switches configured to couple to the second actuator and a shutter.

6. The driver of claim 5, wherein to open the shutter the second switches are opened, one of the first switches and one of the third switches are opened, and one of the first switches and one of the third switches are closed.

7. The driver of claim 1, wherein the light control element comprises a camera iris/ND filter.

8. The driver of claim 1, wherein the light control element comprises a camera shutter and a camera iris/ND filter.

9. The driver of claim 1, wherein the multiplexer selects gate control voltage or a pulse width modulation (PWM) pattern.

10. The driver of claim 1, wherein the first and second actuators are class-D actuators coupled to an autofocus/zoom actuator driver.

11. A combination system that drives a camera shutter and camera filter as well as a camera autofocus and zoom control, the system comprising:
   a filter coupled to a first plurality of MOSFETs;
   a shutter coupled to a second plurality of MOSFETs; and
   actuators coupled to a third plurality of MOSFETs,
      wherein the first plurality of MOSFETS includes first, second, third and fourth MOSFETs, the second plurality of MOSFETs includes first, second, fifth and sixth MOSFETs, and the third plurality of MOSFETs includes third, fourth, fifth and sixth MOSFETs.

12. The system of claim 11, further comprising a first multiplexer selecting between a gate control voltage and a pulse width modulation (PWM) pattern for the third MOSFET.

13. The system of claim 12, further comprising a second multiplexer selection, a gate control voltage and the PWM pattern for the fifth MOSFET.

14. The system of claim 11, wherein the actuators are coupled to zoom and autofocus lenses, and the zoom and autofocus lenses cannot be operated simultaneously.

15. A method of driving a camera shutter, a camera filter, a camera zoom lens, and a camera autofocus lens, the method comprising:
    opening a camera shutter by closing a first switch, opening a second switch, opening a fifth switch, and closing a sixth switch;
    driving a camera zoom lens by opening the first and second switches and selectively manipulating actuators using third, fourth, fifth and sixth switches; and
    opening a camera filter by opening a first switch, closing a second switch, opening a third switch, and closing a fourth switch.

16. The method of claim 15, wherein the third switch is coupled to a first multiplexer selecting between a gate control voltage and a pulse width modulation (PWM) pattern.

17. The method of claim 16, wherein the fifth switch is coupled to a second multiplexer selecting between the gate control voltage and the PWM pattern.

18. The method of claim 15, wherein the switches are MOSFET devices.

19. The method of claim 15, wherein the camera filter is an iris filter.

20. The method of claim 15, wherein the camera zoom lens cannot be driven while the camera shutter is in operation.

21. A camera driver providing electric current to a plurality of actuators using fewer output terminals than actuators, the camera driver comprising:
    first switches configured to couple to a first actuator using a first output;
    second switches configured to couple to a second actuator using a second output, wherein the first and second switches are coupled to a light control driver, wherein the light control driver comprises the second actuator and a third actuator;
    multiplexer selecting inputs to the first and second switches; and
    third switches configured to couple to a fourth actuator using a third output.

22. An integrated circuit, comprising:
    first switches configured to couple to a first actuator; and
    second switches configured to couple to a second actuator, wherein the first and second switches are coupled to the light control driver; and multiplexer selecting inputs to the first and second switches.

* * * * *